Feb. 21, 1950 — S. A. E. LUNDIN — 2,498,130
REVERSIBLE DRIVE FOR REVOLUTIONS COUNTER
Filed July 8, 1947 — 4 Sheets-Sheet 4

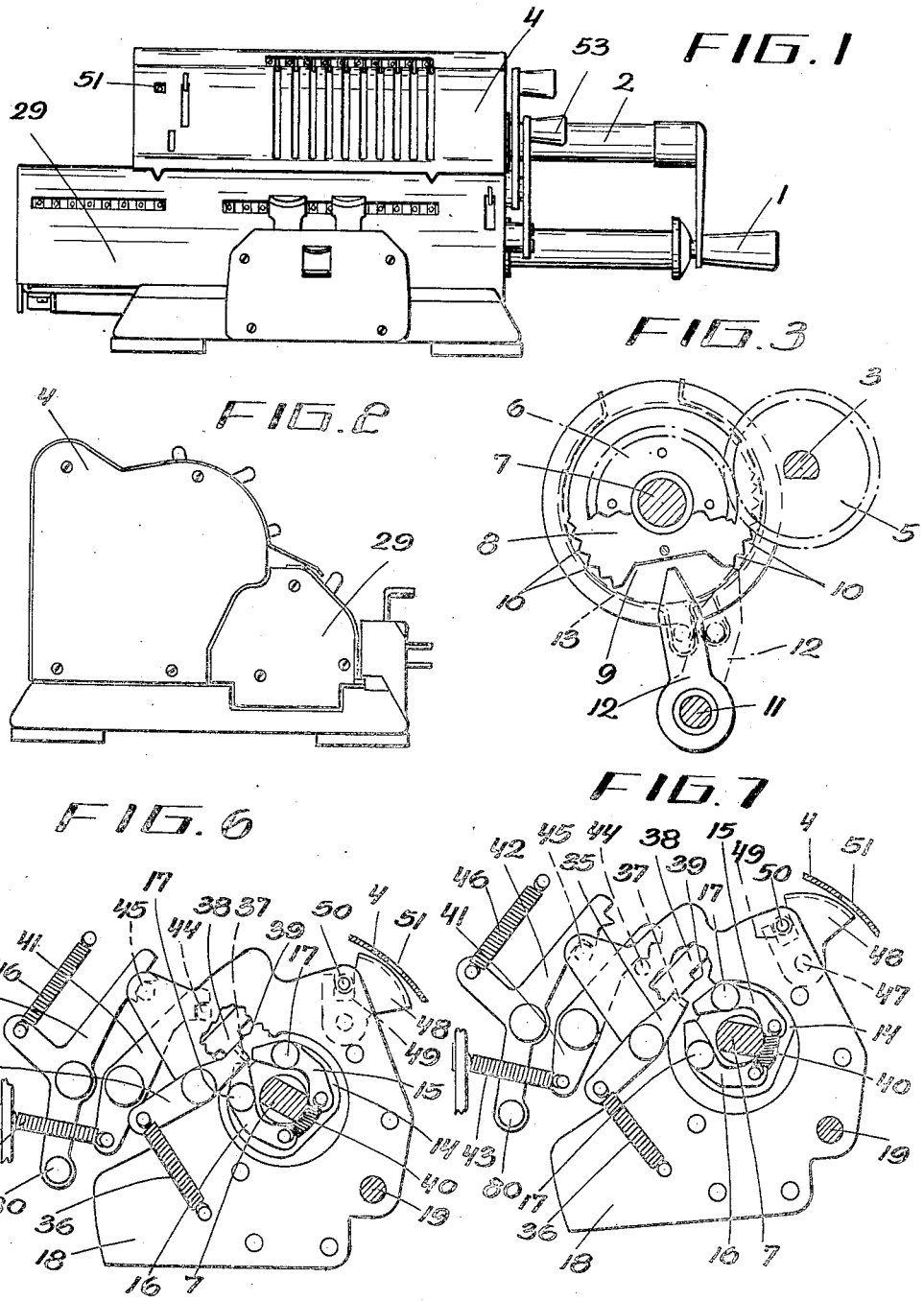

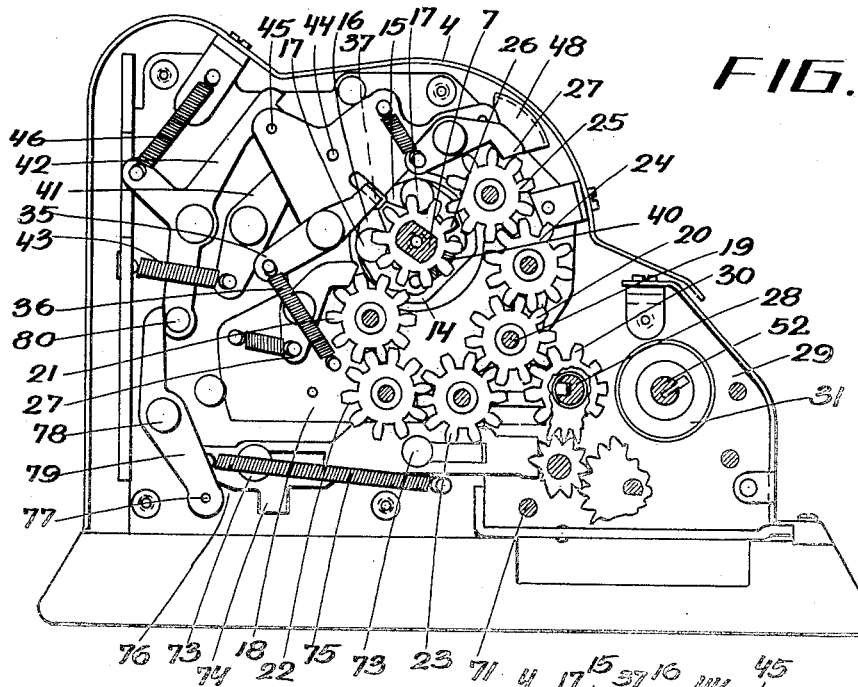
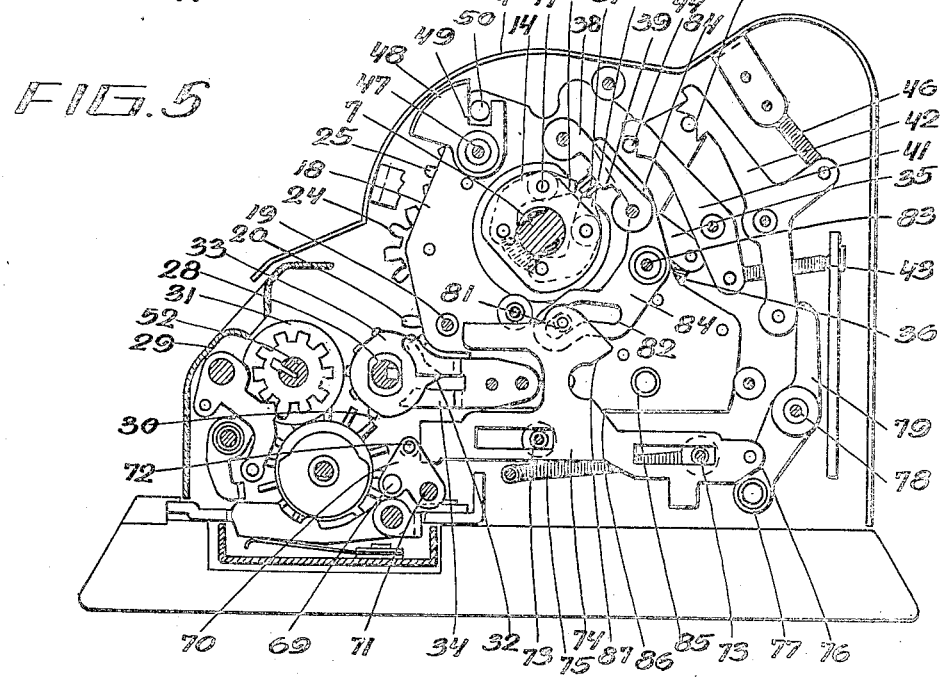

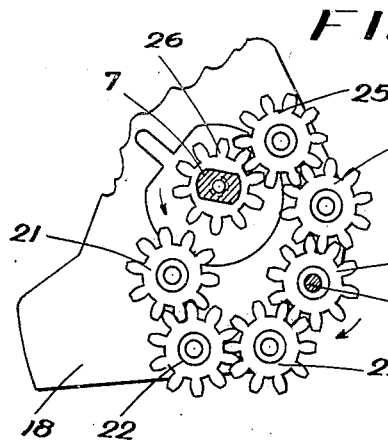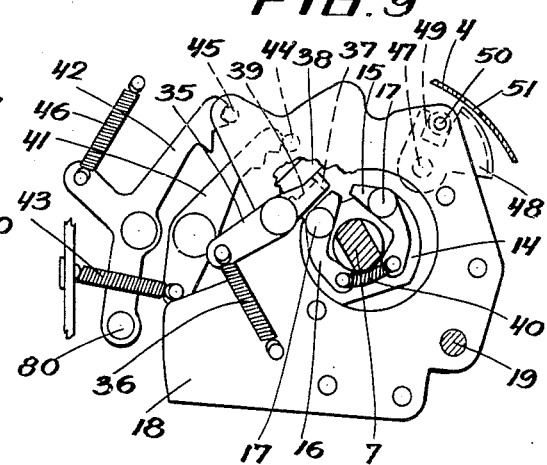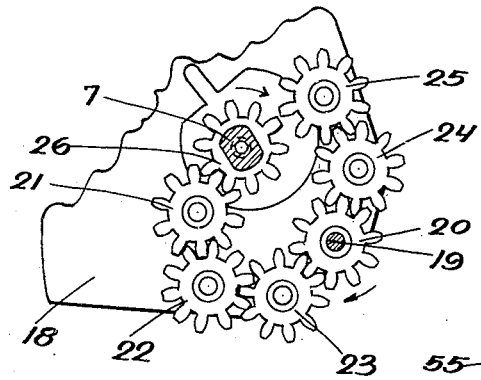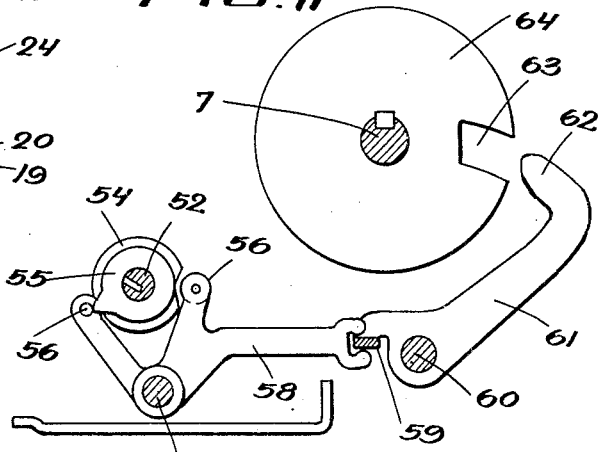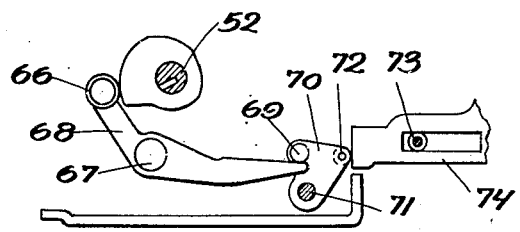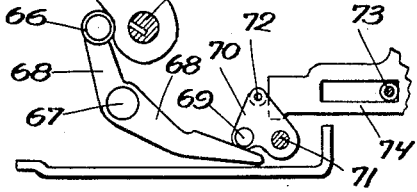

Inventor
SVEN AXEL EVERT LUNDIN
BY
Toulmin & Toulmin
ATTORNEYS

Patented Feb. 21, 1950

2,498,130

UNITED STATES PATENT OFFICE 2,498,130

REVERSIBLE DRIVE FOR REVOLUTIONS COUNTER

Sven Axel Evert Lundin, Malmo, Sweden, assignor to Aktiebolaget Addo, Malmo, Sweden, a corporation of Sweden Application July 8, 1947, Serial No. 759,678
In Sweden July 29, 1946

5 Claims. (Cl. 235—79)

The present invention relates to a driving mechanism for revolutions counting or multiplier registers with tens transmission in calculating machines of the Odhner type. In such machines the revolutions counting register shall show 1, 2, 3, 4, 5, 6, 7, 8, 9, 10, 11 etc. irrespectively of whether the initial rotation movement of the crank shaft takes place in the clockwise or the counter-clockwise direction.

An object of the invention is to provide such a driving mechanism requiring very small space in the machine, especially in its lateral direction.

Another object of the invention is to provide such a driving mechanism which may be constructed so as to be supplied as a special mounting set which, at low cost, may be inserted in a standard machine having no such mechanism without having to exchange the frame and housing of the machine. Previously known mechanisms of the type in question require however such a great space, especially in the lateral direction of the machine, that insertion in a standard machine which from the beginning has no such mechanism can hardly be contemplated.

A further object of the invention is to provide a driving mechanism of the type in question which is operable by means of the driving handle of the machine for driving the revolutions counting register toward higher numbers with an optional direction of rotation of the handle.

Still another object of the invention is to provide a driving mechanism of the type in question which is optionally adjustable in either of two operative positions for driving the revolutions counting register towards higher numbers upon rotation of the handle in either direction and in an inoperative position in which it is automatically restored upon zero setting of the revolutions counting register.

A further object of the invention is to provide a driving mechanism of the type in question in which the adjusted position of the mechanism is indicated visually to the machine operator.

Further objects and advantages of the invention will appear from the following detailed description of an embodiment chosen as an example only and illustrated in the annexed drawings. This embodiment is merely illustrative and must no be considered as limiting the invention in any respect whatever.

In the drawings:

Fig. 1 is a front view of a hand driven machine of the Odhner type with a carriage carrying the result and revolutions counting registers.

Fig. 2 is a side view of the machine from the left in Fig. 1.

Fig. 3 shows a locking means for the handle of the machine.

Fig. 4 is a section from the left in Fig. 1, taken just inside the left end of the machine and shows a driving mechanism according to the invention.

Fig. 5 is a section from the right in Fig. 1, taken somewhat further to the left in the machine than the section according to Fig. 4 (this section is also indicated with the line V—V in Fig. 16) and shows the driving mechanism according to Fig. 4 from the other side.

Fig. 6 is a view similar to Fig. 4 of certain parts of the driving mechanism in neutral position.

Fig. 7 is a view of the parts according to Fig. 6 after a certain rotation of the handle of the machine.

Fig. 8 shows the position of the gear set included in the driving mechanism according to the invention, when the driving mechanism occupies the position according to Fig. 7.

Figs. 9 and 10 correspond to Figs. 7 and 8 and show another position of the driving mechanism when the handle of the machine has effected an initial rotation movement in the direction opposite to that supposed in the case according to Figs. 7 and 8.

Fig. 11 shows a locking means for the main drive shaft upon zero setting of the revolutions counting register.

Figs. 12 and 13 show different positions during a zero setting operation of a mechanism for automatic restoring of the driving mechanism according to the invention in neutral position according to Figs. 4 to 6 upon zero setting of the revolutions counting register.

Figure 14:
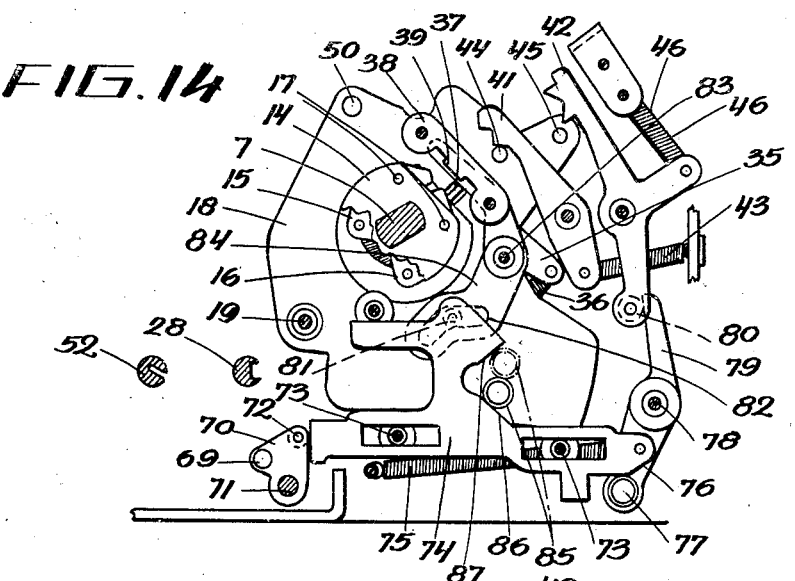
Figure 15:
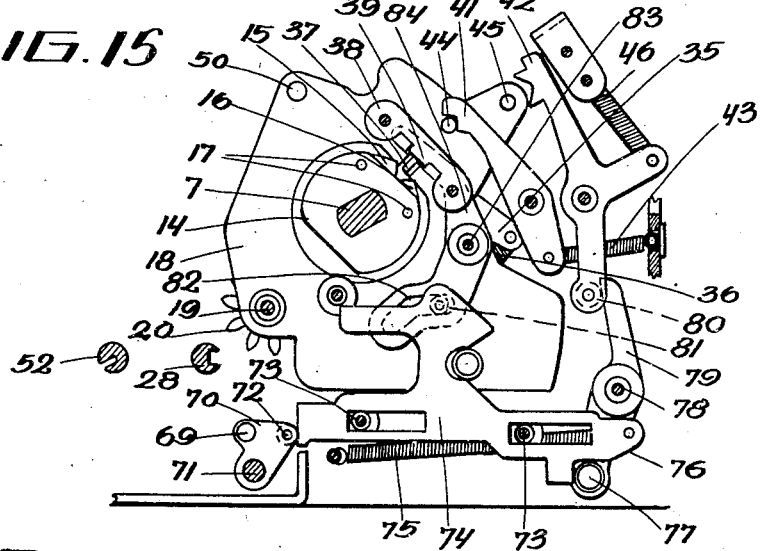

Figs. 14 and 15 similar to Fig. 5 show how the driving mechanism according to the invention is restored to neutral position upon zero setting of the counting register of the machine.

Figure 16:
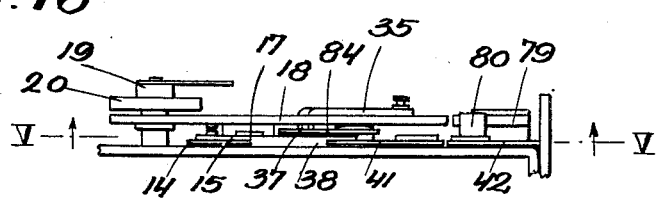

Fig. 16 shows the driving mechanism according to the invention as seen from above.

In all figures substantially only the parts essential to the invention are shown, the other parts of the machine being omitted for the sake of clearance.

In the same manner as in usual calculating machines of the Odhner type a driving handle 1 is fixed on the outer end of a crank shaft 3 mounted in a sleeve 2 and carrying within the housing 4 of the machine a gear 5 meshing with a similar gear 6 on the main drive shaft 7 of the machine (see Figs. 1 and 3). On the main drive shaft there is further fixed a locking disc 8 which on a point of its periphery has a relatively broad recess 9 surrounded on two sides by locking teeth 10. When the handle 1 and thus the main drive shaft 7 occupy their normal position or neutral position a locking arm 12 rotatable about a fixed shaft 11 on the frame of the machine projects into the recess 9 of the locking disc 8 and is held in position by a spring 13. The arrangement is such that after a certain initial rotation of the handle 1 and thus of the main drive shaft 7, e. g., 40° in either direction the locking arm 12 engages the locking teeth 10 of the disc 8 on the respective side of the recess 9 (see the position of the locking arm 12 shown with dotted lines) and prevents returning of the handle to neutral position in another way than by completion of the rotation started.

Adjacent the left end (Fig. 1) of the machine there is fixed on the main drive shaft 7 a mounting plate 14 (see Figs. 4 to 7, 9 and 14 to 16) on which plate two double-armed levers 15, 16 embracing the main drive shaft are mounted on a mounting pin 17 each. The main drive shaft 7 extends through an aperture in a frame plate 18 arranged adjacent the mounting plate 14 and being rotatably mounted on a shaft 19 fixed in the frame of the machine. On the shaft 19 there is adjacent one side of the frame plate 18 freely rotatably but undisplaceably mounted a gear 20 included in a gear set arranged on the frame plate and comprising six single gears 20 to 25 intermeshing in a single row. The gear row is arranged in an arc around the aperture in the frame plate 18, the two outer gears 21 and 25 of the row lying almost on diametrically opposite points of the aperture edge in position for engagement with a driving gear 26 arranged on the main drive shaft 7 adjacent the mounting plate 14 in one plane with the gear set 20 to 25, when the frame plate 18 is rotated about the shaft 19 in the manner described in the following. The gear set 20 to 25 is held in the adjusted position by two spring-actuated latch pawls 27 and the gear 20 engages except the adjacent gears 23 and 24 of the gear set a gear 30 displaceably mounted on a shaft 28 in the counting register carriage 29, which latter gear, in the known manner, is adapted to drive the digit wheels 31 of the revolutions counting register by means of a single tooth 32 arranged on a disc 33 fixedly connected to the gear 30. Upon displacement of the carriage 29 the gear 30 displaceable on the shaft 28 is forced to be opposite to and in engagement with the gear 20 by the fact that a fork-shaped plate 34 fixed on the stand of the machine embraces the disc 33 connected to the gear 30 by means of its fork arms.

On the frame plate 18 there is pivotally mounted a double-armed latch pawl 35 one arm of which is actuated by a draw spring 36 tending to press a lug 37 arranged on the other arm of the latch pawl and projecting toward the other side of the frame plate 18 through a slot connected to the aperture provided in the frame plate for the main drive shaft 7, against a locking bar 38 fixed on the machine frame. In the mid position or neutral position of the frame plate 18 the spring 36 holds the latch pawl 35 with its lug 37 in contact with a central projection 39 of the locking bar 38, which projection is limited by steep side walls. In this position the lug 37 of the latch pawl 35 is partly situated in the space between the one ends of the levers 15 and 16 mounted on the mounting plate 14 of the main drive shaft 7, so that either of the levers 15 and 16 upon rotation of the main drive shaft in either direction will meet the lug 37 and thereby swing the frame plate 18 about the shaft 19 until the lug 37 of the latch pawl 35 under the action of the spring 36 falls down from the central projection 39 of the locking bar 38, the lug 37 being moved out of the path of the levers 15 and 16, so that the main drive shaft 7 may be freely rotated in the desired direction without actuation of the frame plate 18 thus adjusted. The angle of rotation of the main drive shaft 7 necessary for moving the lug 37 out of the way is smaller than the angle necessary for the locking arm 12 (see Fig. 3) to engage the locking teeth 10, so that after the initial rotation of the main drive shaft 7 for moving the latch pawl lug 37 out of the way it is possible to rotate the main drive shaft in any direction without having to complete the revolution initially started. The one arm ends of the levers 15 and 16 are held in the proper position for engagement with the latch pawl lug 37 by means of a spring 40 pressing the other arm ends of the levers against the main drive shaft 7.

In the mid position or neutral position the frame plate 18 is held by two locking levers 41 and 42, the locking lever 41 having at its one end a W-shaped edge which by means of a draw spring 43 actuating the lever 41 is pressed against a pin 44 on the frame plate 18, while the locking lever 42 at its one end has an M-shaped edge which is pressed against a pin 45 on the frame plate 18 by means of a draw spring 46 actuating the lever 42. In the neutral position the pins 44 and 45 of the frame plate 18 rest in the central depressions of the W- and M-shaped edges of the locking levers (see Figs. 5 and 6).

When the handle 1 is initially rotated in subtractive direction, i. e. when the main drive shaft 7 is rotated in the counter-clockwise direction with respect to Figs. 7 and 8, the end of the lever 15 mounted on the mounting plate of the main drive shaft 7 meets the lug 37 of the latch pawl 35 and moves said lug together with the frame plate 18 until the lug 37 leaves the lower edge of the projection 39 as shown in Fig. 7. Upon this tilting of the frame plate 18 the pins 44 and 45 slide out of the central depressions in the W- and M-shaped edge portions of the locking levers 41 and 42 pressing the levers out of the way against the action of their draw springs 43 and 46. After the tilting described of the frame plate 18 the parts occupy the positions shown in Fig. 7 and 8. Thus the outer gear 25 of the gear set 20 to 25 has been brought into engagement with the driving gear on the main drive shaft 7, so that the motion of the driving gear is transmitted to the gear 20 driving the revolutions counting register of the machine through the gear 30 and the driving tooth 32. If the main drive shaft 7 is caused to complete the started revolution in the counter-clockwise direction the gear 20 is rotated one revolution in the clockwise direction, the digit wheel situated at the moment opposite the driving tooth 32 being advanced in the known manner one step to the next higher digit by means of said driving tooth 32. If, however, after the small initial movement for tilting of the frame plate 18 to the position shown in Figs. 7 and 8 the main drive shaft 7 is returned and caused to effect a revolution in the clockwise direction or if after a rotation of one or more revolutions in the counter-clockwise direction the shaft 7 is caused to rotate in the clockwise direction the above described movement in reversed, so that the digit wheel 31 in question is advanced one step towards a lower digit for each revolution of the main drive shaft in the clockwise direction. The adjustment just described of the frame plate 18 may be called the subtractive working position as the gear set 20 to 25 drives the revolutions counting register towards higher numbers when the handle is rotated in subtractive direction. This adjusted position of the frame plate 18 is made visible to the operator by means of an indicator having the form of a sector 48 rotatable about a pivot 47 fixed on the machine frame, said sector having a recess 49 in which a pin 50 on the frame plate 18 is engaged. The bent peripheral edge of the sector 48 is provided at its lower end with e. g. a minus sign which, in the position according to Fig. 7 is visible through a window 51 in the machine housing 4. In the neutral position of the frame plate 18 according to Fig. 6 the central portion of the bent edge of the sector 48 is situated before the window 51, this portion being provided with e. g. a zero in order to indicate that the frame plate 18 occupies neutral position.

When the initial rotation of the main drive shaft 7 is effected in the clockwise direction with respect to Figs. 9 and 10, i. e. when the handle 1 is rotated in additive direction the lug 37 of the latch pawl 35 is moved away from the projection 39 of the locking bar 38 over the upper edge of the lever 16 arranged on the mounting plate 14, so that the frame plate 18 is swung in the clockwise direction to the operative position shown in Figs. 9 and 10, while the pins 44 and 45 are moved away from the central depressions of the W- and M-shaped edge portions of the locking levers 41 and 42. When the frame plate 18 is swung in such a way the outer gear 21 of the gear set 20 to 25 is brought into engagement with the driving gear 26 fixed on the main drive shaft 7, so that upon continued rotation of the main drive shaft in the clockwise direction the gear 20 is rotated in the clockwise direction. Thus, through the gear 30 and the driving tooth 32, the gear 20 will drive the digit wheel 31 of the revolutions counting register of the machine aligned with the driving tooth 32 one step to the next higher digit upon each full revolution of the handle 1 in additive direction. If, after the small rotation which is necessary for swinging the frame plate 18 to the position according to Figs. 9 and 10, the handle is returned and caused to effect one or more revolutions in subtractive direction or if after one or more revolutions in additive direction the handle is caused to make one or more revolutions in subtractive direction the gear 20, as will readily be seen, will rotate the digit wheel 31 in question one step to the next lower digit for each revolution of the handle in subtractive direction. The operative position of the frame plate 18 shown in Figs. 9 and 10 may therefore be called the additive adjustment position which is made visible to the operator in that the upper edge portion of the indicating sector, which portion may be marked e. g. with a plus sign is swung to a position opposite the window 51 in the machine housing 4.

In the embodiment shown the frame plate 18 is adapted to be returned fully automatically from its operative positions to the neutral midposition upon zero setting of the revolutions counting register of the machine. Zero setting of the revolutions counting register is effected in the known manner by rotating a shaft 52 carrying the digit wheels 31 through one revolution by means of a handle 53. The zero setting may of course be effected only when the handle 1 occupies neutral position. For that reason there are mounted two curved discs 54, 55 (Fig. 11) on the shaft 52, one 54 of which discs has a recess whereas the other 55 has a projection for cooperation with two pins or rollers 56 on two arms of a coupling lever 58 mounted on a shaft 57, in such a way that the arm of the coupling lever, which extends to the right in Fig. 11 and the end of which is fork-shaped, immediately at the beginning of the rotation of the shaft 52 is forced downwardly and immediately at the end of the zero setting revolution of the shaft 52 is forced back to the normal position shown. The fork-shaped arm of the coupling lever 58 embraces a lug 59 on one arm of a latch pawl 61 rotatable about a pivot 60, the other arm of which is provided with a nose 62 for engagement with an edge recess 63 in a circular disc 64 non-rotatably fixed on the main drive shaft 7. The guided downward swinging of the fork-shaped arm of the coupling lever 58 at the beginning of the zero setting revolution of the shaft 52 may thus take place only when the edge recess of the disc 64 fixed on the main drive shaft 7 is situated opposite the nose 62 of the latch pawl 61 which is the case when the main drive shaft 7 and thus the handle 1 occupies normal position as otherwise the nose 62 of the latch pawl 61 meets the periphery of the disc 64 and prevents the swinging of the coupling lever 58 and thereby rotation of the shaft 52.

On the shaft 52 there is further fixed a cam plate 65 (see Figs. 12 and 13) against which a roller 66 on one arm of a lever 68 rotatable about a pivot 67 on the counting register carriage is applied. The other arm of the lever 68 is applied against the underside of a pivot 69 on one of two plates 70 mounted on a shaft 71 on the counting register carriage and carrying between each other a bar 72 the length of which corresponds to the length of the lateral displacement of the revolutions counting register. The bar 72 is applied against the end of a link 74 mounted on the machine frame by means of pins 73 provided with rollers (see also Figs. 5, 14 and 15), which link is pressed against the bar 72 by a draw spring 75, which bar 72 under the intermediary of the plate 70, the pin 69 and the lever 68 rests against the cam plate 65.

When the zero setting shaft 52 is rotated in the clockwise direction with respect to Figs. 12 and 13 the cam plate 65 rotates the lever 68 in the counter-clockwise direction from the position shown in Fig. 12 to the position shown in Fig. 13, the bar 72 displacing the link 74 to the right with respect to Figs. 12 and 14 against the action of the spring 75. Immediately at the beginning of this displacement of the link 74 a cam surface 76 arranged on the link 74 swings a lever 79 mounted on a fixed pivot 78 on the machine frame and applied against the said cam surface with a roller 77 in the counter-clockwise direction, see Fig. 14 which shows an intermediate position during the displacement of the link 74 to the right. The upper arm of the lever 79 is applied against a roller 80 on the downwardly extending arm of the locking lever 42, so that the M-shaped edge portion of the lever 42 at the beginning of the displacement of the link 74 is lifted out of the path of the pin 45 of the frame plate 18 (see Fig. 14). The link 74 carries also a roller 81 engaging an angle-shaped slot 82 in a lever 84 mounted on the pivot 83 on the frame plate 18. In the normal position of the link 74 (Fig. 5) the roller 81 is situated in the lower branch of the angle-shaped slot 82 in the lever 84, the upper arm of which in this position lies obliquely above and at a distance from the lug 37 of the locking lever 35. Immediately at the beginning of the displacement of the link 74 to the right, the roller 81 slides up into the upper branch of the slot 82 swinging the lever 84 in such a way that the upper arm of the lever meets the lug 37 of the latch pawl 35, situated beside the projection 39 of the locking bar 38 and moves said lug out of the path of the projection 39 in relation to the lug. The frame plate 18 occupying additive (Fig. 9) or subtractive (Figs. 7 and 14) working position is hereafter held in working position by the locking lever 41 only, but may relatively easily be moved to neutral position against the action of the draw spring 43 of the locking lever 41 owing to the W-shaped form of the locking portion of the lever. This restoration is effected by the fact that a roller 85, mounted on the frame plate 18 at the end of the displacement of the link 74 to the right with respect to Figs. 14 and 15 meets either of two cam surfaces 86 and 87 of the link 74, which are arranged in V-form in relation to each other and which at the displacement of the link force the frame plate 18 to swing to neutral position, the pin 44 of the frame plate snapping into the central depression of the W-shaped locking portion of the locking lever 41, so that the frame plate is held in neutral position until it is further locked in this position by the locking lever 42 in the manner described in the following. The cam surface 86 actuates the roller 85 of the frame plate 18 when said plate is to be restored from subtractive position according to Figs. 7 and 14, while the cam surface 87 swings the frame plate when the latter occupies additive working position according to Fig. 9.

During the last small part of the rotation of the zero setting shaft 52 the roller 66 of the lever 68 (Fig. 13) is rolling down a steep inclined portion of the cam 65 back to its normal position, the link 74 being thus rapidly moved back to the normal position under the action of the draw spring 75. Hereby the pivot 81 of the link returns the lever 84 to the normal position, the lug 37 of the latch pawl 35 being moved in contact with the projection 39 of the locking bar 38 by the draw spring 36 of the latch pawl, while the cam surface 76 of the link lets the lever 79 return to the normal position under action of the draw spring 36 of the locking lever 32, the M-shaped locking portion of the locking lever seizing with its projections the pin 45 of the frame plate 18 and holding the frame plate in neutral position (see Fig. 5).

Of course the invention must not be considered as limited to the embodiment described above and shown in the drawings for important modifications may be made without departing from the inventive idea as will readily be seen by those skilled in the art. As regards the gear set 20 to 25 it may especially be observed that the number of the gears may be another than the number shown, provided that the gear set fulfills the conditions indicated in the claims. Likewise the coupling of the driving gear 26 with the gear set may be effected in another way than by swinging a frame plate 18 for the gear set. The coupling of the gear set with the driving gear need not be made automatically by means of an initial movement of rotation of the main drive shaft of the machine although that seems to be most suitable. The restoration of the gear set in neutral position may also be made in another manner than automatically upon zero setting of the revolutions counting register.

What I claim and desire to secure by Letters Patent is:

1. In calculating machines of the Odhner type having a main drive shaft and a revolutions counting or multiplier register with tens transmission means; a driving mechanism including a driving gear on said main drive shaft, a set of gears intermeshing so as to constitute an open transmission gear chain; mounting means for said gear set; means for supporting said mounting means swingable in either direction around a fulcrum coaxial with the axis of one of the gears of said gear set, means controlled by said main drive shaft for swinging said mounting means in either direction, depending on the direction of the initial rotatory movement of said main drive shaft when starting a calculating operation, for connecting one end and the other, respectively, of said transmission gear chain with said driving gear, said transmission gear chain altering the direction of the torque exerted by said driving gear an even number of times from one end of the chain to the other when counting from said driving gear, and means for driving said multiplier register from that gear of said gear set, being coaxial with said fulcrum.

2. In calculating machines of the Odhner type having a main drive shaft and a revolutions counting or multiplier register with tens transmission means and zero setting means; a driving mechanism including a driving gear on said main drive shaft, a set of gears intermeshing so as to constitute an open transmission gear chain, mounting means for said gear set, means for supporting said mounting means swingable in either direction around a fulcrum coaxial with the axis of one of the gears of said gear set, means controlled by said main drive shaft for swinging said mounting means in either direction, depending on the direction of the initial rotatory movement of said main drive shaft when starting a calculating operation, for connecting one end and the other, respectively, of said transmission gear chain with said driving gear, said transmission gear chain altering the direction of the torque exerted by said driving gear an even number of times from one end of the chain to the other when counting from said driving gear, means for positioning of said transmission gear chain wholly out of mesh with said driving gear upon actuation of said zero setting means, and means for driving said multiplier register from one of the gears of said gear set.

3. In calculating machines of the Odhner type having a main drive shaft and a revolutions counting or multiplier register with tens transmission means and zero setting means, a driving mechanism including a driving gear on said main drive shaft, an even number of single gears intermeshing in a single row, a mounting plate for said gears in said gear row, means for supporting said mounting plate swingable in either direction around a fulcrum coaxial with the axis of one of the gears in said gear row, means controlled by said main drive shaft for swinging said mounting plate in either direction, depending on the direction of the initial rotatory movement of said main drive shaft when starting a calculating operation, for connecting one end gear and the other, respectively, of said gear row with said driving gear, means for positioning said gear row wholly out of mesh with said driving gear upon actuation of said zero setting means, indicating means visually indicating for the operator the momentary position of said mounting plate, and means for driving said multiplier register from one of the gears in said gear row.

4. In calculating machines of the Odhner type having a main drive shaft and a revolutions counting or multiplier register with tens transmission means and zero setting means, a driving mechanism including a driving gear on said main drive shaft, a set of gears intermeshing so as to constitute an open transmission gear chain, means for establishing connection between one end of said transmission gear chain and said driving gear when during a calculating operation the initial rotatory movement of said main drive shaft is accomplished in one direction, and for establishing connection between the other end of said transmission gear chain and said driving gear when during a calculating operation the initial rotatory movement of said main drive shaft is accomplished in the other direction, said transmission gear chain altering the direction of the torque exerted by said driving gear an even number of times from the one end of the chain to the other when counting from said driving gear, locking means for automatically maintaining said connection between either end of said transmission gear chain and said driving gear irrespective of the direction of the rotatory movement of said main drive shaft following said initial rotatory movement thereof, means for driving said multiplier register from one of the gears in said gear train, and means for releasing said locking means and positioning of said transmission gear chain wholly out of mesh with said driving gear upon actuation of said zero setting means.

5. In calculating machines of the Odhner type having a main drive shaft and a revolutions counting or multiplier register with tens transmission means and zero setting means, a driving mechanism including a driving gear on said main drive shaft, a set of gears intermeshing so as to constitute an open transmission gear chain, mounting means for said gear set, means for supporting said mounting means swingable in either direction around a fulcrum coaxial with the axis of one of the gears of said gear set, means controlled by said main drive shaft for swinging said mounting means in either direction, depending on the direction of the initial rotatory movement of said main drive shaft when starting a calculating operation, for establishing connection between one end and the other, respectively, of said transmission gear chain with said driving gear, said transmission gear chain altering the direction of the torque exerted by said driving gear an even number of times from one end of the chain to the other when counting from said driving gear, locking means for automatically maintaining said connection between either end of said transmission gear chain and said driving gear irrespective of the direction of the rotatory movement of said main drive shaft following said initial rotatory movement thereof, means for releasing said locking means and positioning of said transmission gear chain wholly out of mesh with said driving gear upon actuation of said zero setting means, and means for driving said multiplier register from one of the gears of said gear set.

SVEN AXEL EVERT LUNDIN.

REFERENCES CITED

The following references are of record in the file of this patent:

UNITED STATES PATENTS

| Number | Name | Date |
| --- | --- | --- |
| 1,173,062 | Trinks | Feb. 22, 1916 |
| 1,400,004 | Schaller | Dec. 13, 1921 |
| 1,949,740 | Friden | Mar. 6, 1934 |
| 2,260,291 | Britten, Jr. | Oct. 28, 1941 |
| 2,393,019 | Avery | Jan. 15, 1946 |